United States Patent [19]

Hale

[11] Patent Number: 4,809,480
[45] Date of Patent: Mar. 7, 1989

[54] BUILDING METAL SUPPORT APPARATUS AND METHOD

[76] Inventor: Cecil E. Hale, 281 E. Frye Rd., Chandler, Ariz. 85225

[21] Appl. No.: 853,654

[22] Filed: Apr. 18, 1986

[51] Int. Cl.$^4$ ............................................... E04B 1/38
[52] U.S. Cl. ......................................... 52/702; 52/90; 52/639; 52/721; 403/199
[58] Field of Search ............... 52/698, 702–704, 52/710, 711, 721, 714, 639, 93, 90, 92, 726, 732, 93, 726; 403/199, 245, 246

[56] References Cited

U.S. PATENT DOCUMENTS

| | | | |
|---|---|---|---|
| 3,414,300 | 12/1968 | Spane | 52/93 X |
| 4,041,659 | 8/1977 | McElhoe | 52/639 X |
| 4,342,177 | 8/1982 | Smith | 52/93 |
| 4,408,423 | 10/1983 | Lautensleger et al. | 52/90 |

FOREIGN PATENT DOCUMENTS

| | | | |
|---|---|---|---|
| 525969 | 6/1956 | Canada | 52/93 |
| 875812 | 7/1971 | Canada | 52/93 |
| 2300863 | 10/1976 | France | 52/702 |

*Primary Examiner*—Carl D. Friedman
*Assistant Examiner*—Naoko N. Slack
*Attorney, Agent, or Firm*—Harry M. Weiss & Associates

[57] ABSTRACT

A metal building frame and method for its assembly is disclosed. The building frame includes channel shaped structural members which are utilized for rafters, girders, and vertical columns. The various structural members are joined together by specially designed joining clips which provide structural strength and ease of assembly. Each of the clips includes a channel shape member into which one of the structural members can be inserted and bolted in place. Ridge clips join two of the rafters and are joined together at a preselected angle to define the roofline of the building. A rafter clip is attached to the top of each of the vertical columns and includes and angled portion which is bolted to the outer end of each of the rafters at an angle which is consistent with the preselected angle. The lower end of each vertical column is bolted to a base clip which in turn provides a base member which may be bolted to the floor of the building. Girder clips interlock with the vertical columns and support girders which extend horizontally between the vertical columns. Group support members are bolted to the tops of the rafters and extend perpendicular to the rafters spanning the space between two rafters to support a sheet roof material.

10 Claims, 2 Drawing Sheets

BUILDING METAL SUPPORT APPARATUS AND METHOD

BACKGROUND OF THE INVENTION

This invention relates generally to a building frame structure and method for its assembly, and more specifically to a metal building frame suitable for easy assembly.

In the fabrication of frame buildings for use as storage sheds, garages, and the like, it is important that the structure be easy to assemble, low in cost, and involve a minimum number of structural members providing adequate structural strength Frames structures can be constructed using the techniques disclosed, for example, in U.S. Pat. No. 4,551,957, filed on May 23, 1983 and issued to Herbert T. Madray on Nov. 12, 1985, but such techniques are not low cost nor are they easy to assemble. Other techniques involve, for example, standard wood frame construction utilizing wooden rafters, joists, and studs. Wooden frame construction requires a large number of structural elements to achieve the necessary structural strength.

Accordingly, a need existed for an improved building frame and method which would overcome the deficiencies of the prior art techniques.

SUMMARY OF THE INVENTION

It is therefore an object of this invention to provide a metal building frame which is structurally strong and easy to assemble.

It is another object of this invention to provide a method for assembling a metal building frame structure.

It is yet another object of this invention to provide joining clips for the easy assembly of structural members.

The foregoing and other objects and advantages of the invention are achieved, in accordance with the invention, through the use of a plurality of channel-shaped structural members joined together by assembly clips In accordance with one embodiment of the invention a metal building frame structure is assembled from channel-shaped structures which are used for rafters, girders, and vertical columns The joining clips used for interconnecting the various structural members each includes a first channel-shaped member which mates with and bolts to one of the structural members. Ridge clips which are used for joining two of the structural members to define a roofline are bolted to two of the structural members and then are bolted together through a second portion which is welded to the channel-shaped portion at an acute angle. The acute angle of the two ridge clips, when bolted together, define the roof angle at the ridge. Rafter clips are bolted to the ends of vertical columns. The rafter clip also includes an angled portion to which the outer end of the rafter is bolted. The angle of the rafter clip is chosen to be supplemental to the ridge clip angle so that together, the two vertical members and two rafters define a structurally sound wall and roof framing member. A number of such members are assembled, depending upon the length of the building to be constructed. The bottom end of the vertical column is bolted to a base clip which is, in turn, bolted to the building floor. Girder clips interlock with the vertical columns and are, in turn, bolted to girders which extend horizontally between vertical columns. Roof supporting members are bolted to the top of the rafters, perpendicular to the rafters and spanning the distance between two rafters to support a sheet roofing material. In one embodiment, building walls are made of sheet material which is bolted to the vertical columns. The invention will be more fully understood from a review of the following detailed description of the preferred embodiments considered together with the figures.

DETAILED DESCRIPTION OF THE PREFERRED EMBODIMENTS

Figure 1:
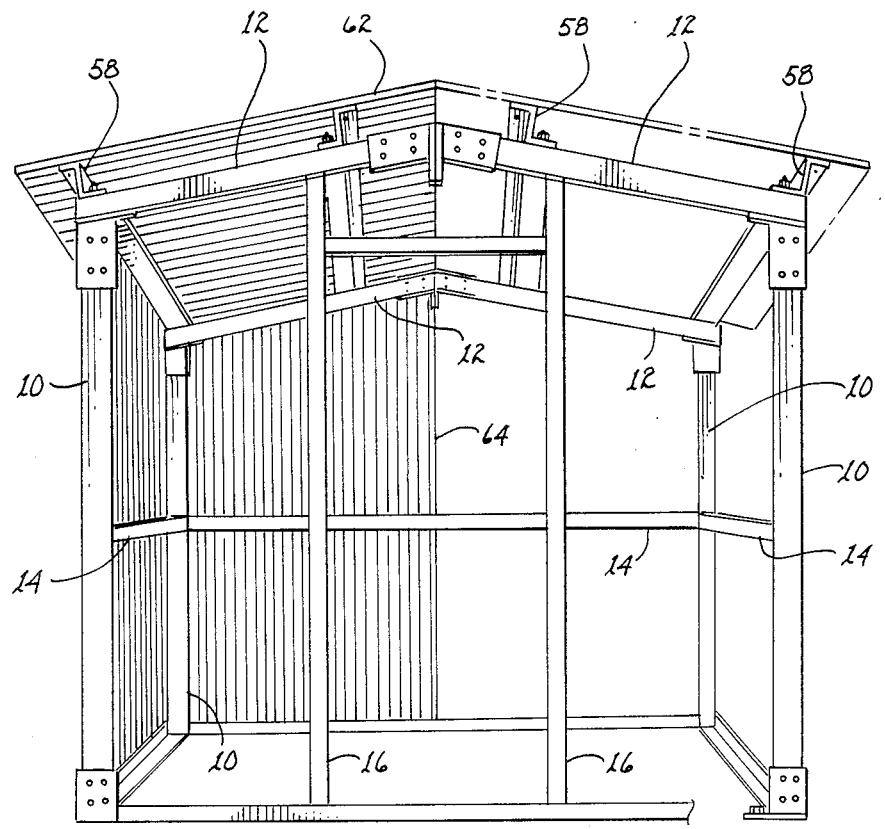
FIG. 1 illustrates, schematically, in a partial perspective view, building frame structure in accordance with one embodiment of the invention.

FIG. 1 illustrates schematically, in a partial perspective view, a building frame structure in accordance with one embodiment of the invention. The structure includes four vertical columns 10 supporting the four corners of the structure. Four rafter members 12, in pairs, form roof trusses which support the roof structure. Horizontal girders 14 extend between the vertical columns and add structural strength to the structure. Two additional vertical columns 16 make up a door jamb structure. The construction and assembly of the building frame structure is explained fully below.

Figure 2:
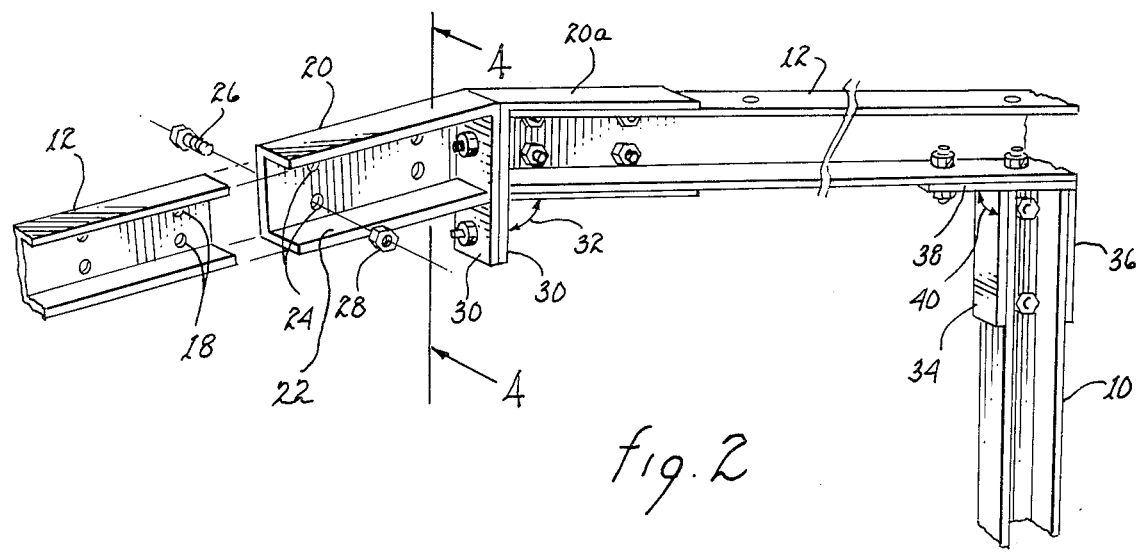
FIG. 2 illustrates the joining together of rafters at a ridge line and the joining of a rafter to a vertical column.

FIG. 2 illustrates the assembly of two rafters 12 to form a roof truss. Key to the assembly of the structure, in accordance with the invention, is a plurality of clips which are used to join the various structural members. As illustrated, the structural members have a channel-shaped cross-section, or as illustrated below, a C-shaped cross-section. Each of the rafter members has holes 18 drilled therethrough to allow bolting to a ridge clip 20. The ridge clip 20 includes a channel-shaped mating portion 22 into which rafter member 12 can be positioned. Holes 24 in the ridge clip 20 mate with holes 18 in the rafter member 12. When the rafter member is properly positioned in the ridge clip, a bolt 26 is passed through the mating holes and secured with a nut 28. Besides the channel-shaped 22, the ridge clip also includes a joining plate 30 which is fastened, preferably by welding at the end of the channel-shaped portion 22. The joining plate, which closes the end of the channel-shaped portion, forms an acute angle with the channel-shaped portion 22. The acute angle is indicated by the double headed arrow 32. The joining plate 30 is provided with holes so that two ridge clips 20, 20a can be bolted together, as illustrated, to form the ridge of the building structure. The acute angle 32 is selected to provide the desired peak to the roof of the building structure.

The outer end of the rafter member 12 is joined to a vertical column 10 by a rafter clip 34. The rafter clip includes a channel-shaped member 36 and a rafter plate 38 fastened, preferably by welding, at the end of a closing the end of the channel-shaped portion. The channel-shaped portion 36 is of a size selected so that the end of the vertical column 10 can be inserted into the clip and bolted by bolts passing through mating holes formed in the clip and the end of the vertical column. The rafter plate 38 forms and obtuse angle with the channel-shaped portion 36 and indicated by the doubleheaded arrow 40. The obtuse angle is supplemental to the acute angle 32 so that the two together has up to 180 degrees Bolts passed through mating holes in the end of the rafter and the rafter plate and secure the end of the rafter and position relative to the vertical column.

Figure 3:
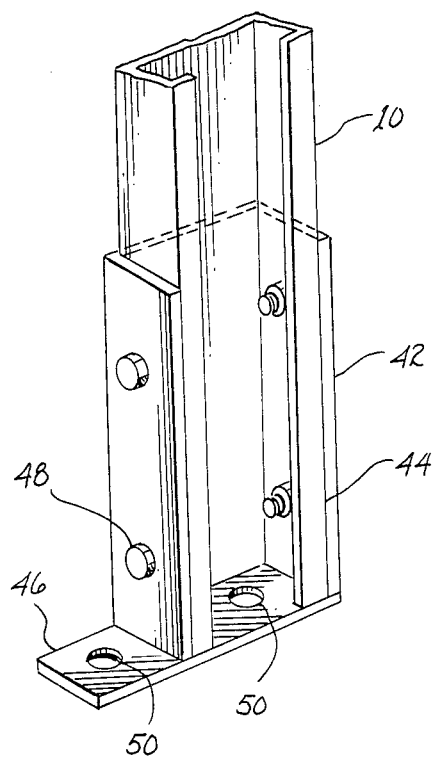
FIG. 3 illustrates the joining of a vertical column to a base clip.

The bottom end or base of the vertical column is secured in place by the base clip 42 as illustrated in FIG. 3. The base clip includes a channel-shaped portion 44 into which the bottom of vertical column 10 is positioned and a base plate 46 which rests on and can be attached to the building floor. Channel-shaped portion 44 is adapted to receive the bottom end of column 10 which is bolted in place by bolts 48 which pass through mating holes in the clip and the column The building is preferably fabricated on a concrete slab or the like, and base plate 46 is bolted to that slab by bolts which pass through holes 50.

Figure 4:
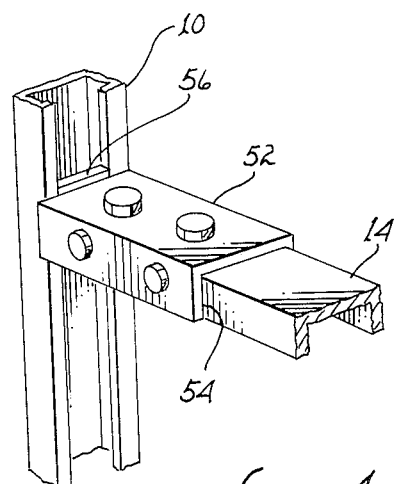
FIG. 4 illustrates the joining of a girder to a vertical column using a girder clip.

As illustrated in FIG. 4, horizontal girders 14 are joined to vertical columns 10 by girder clips 52. The girder clip includes a channel-shaped member 54 into which the girder is positioned and bolted and a locking end 56 which engages with the C-shaped cross-section of the vertical column. The girder 14 extends from the column, as shown, to another vertical column or to a jamb.

As illustrated in FIGS. 2–4, the structural members, rafters, vertical columns, and girders, are generally of a channel-shaped cross-section or, for extra strength, have a C-shaped cross-section. The vertical columns, especially, have a preferred C-shaped cross-section.

Figure 5:
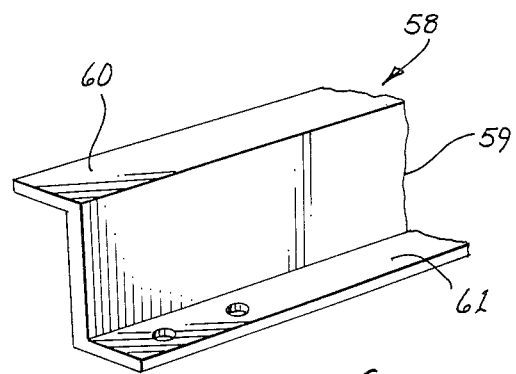
FIG. 5 illustrates a roof support member.

Bolted to the top of the rafters is a roof support member 58 which preferably has a Z-shaped configuration as illustrated in FIG. 5. The Z-shaped configured member includes a vertical portion 59 and two horizontal portion 60, 61 extending outwardly therefrom to provide structural strength. Roof support member 58 is bolted to the top of rafter members 12 and extend substantially perpendicular to the rafters spanning the distance between two adjacent rafters. The roof supports 58 thus provide structural strength to the structure in addition to supporting a sheet type roof material 62 as illustrated in FIG. 1.

Doorways and the like are provided by additional vertical columns such as door jamb 16 which are bolted to the rafter members and are attached to the flooring of the structure by a base clip 42. A sheet siding material 64 can be attached to the girders and vertical columns to complete the structure.

In accordance with the invention, a frame building structure is constructed by selecting four channel-shaped structure members having a preselected length. These structural members are used to support the four corners of the building. If a longer building is desired, more than four members can be used with the additional members spaced along the sides of the buildings. A rafter clip, as described above, is bolted to one end of each of the vertical structural members. Likewise, a base clip, as described above, is bolted to the bottom end of each of the vertical structural members. Four additional structural members, of the proper length, are provided as rafters for the structure. Again, for a building of greater length, additional rafters, equal to the number of vertical columns, can also be used. To one end of each of the rafter members, a ridge clip, as described above, is bolted. The rafters are then joined together, in pairs, by bolting together the joining plates of ridge clips. The two rafter members, thus joined together, form a roof truss with the roof angle determined by the angle between the joining plate and the channel member of the ridge clip. The roof truss is then joined at each end to a vertical column member by bolting the rafter plate of the rafter clip to the end of each rafter. The building assembly is continued by engaging one or more girder clips with each of the vertical column members. Horizontal girders are then bolted to each of the girder clips to hold the vertical column members in the proper vertical orientation. The bases of each vertical column are bolted to the building floor by bolts passing through the bass plate of the base clips. Roof support members are then bolted to the top of the rafter structural members spanning the space between rafters and providing extra structural rigidity. A sheet roofing material and a sheet siding material is then attached to the structure to close in the building.

Thus it is apparent that there has been provided, in accordance with the invention, a metal building apparatus and method for its assembly which fully meets the objects and advantages set forth above. Although the invention has been described and illustrated with reference to specific embodiments thereof, it is not intended that the invention be limited to these illustrative embodiments. Those skilled in the art will recognize, after review of the foregoing detailed description, that variations and modifications are possible without departing from the spirit of the invention. For example, as described above, each of the clip members includes a channel portion into which one of the structural members can be inserted and bolted. Likewise, the invention is intended to cover a clip member which, instead, inserts into the end of the channel-shaped structural member and is there bolted in place. Further, it is described, in the preferred embodiment that the clips are assembled by welding the end piece to the channel-shaped member. Other means of forming the clips are also contemplated. Accordingly, the invention is considered to include all such variations and modifications as fall within the scope of the accompanying claims.

Thus, while the invention has been particularly shown and described in reference to preferred embodiments thereof, it will be understood by those skilled in the art that changes in form and details may be made without departing from the spirit and scope of the invention.

What is claimed is:

1. A metal building apparatus, comprising:

C-shaped cross-section vertical column members;

girder members and rafter members each having a channel-shaped cross section;

ridge clips for joining two of said rafter members, each of said ridge clips including a channel-shaped portion into which the end of one of said rafter members can be positioned and a joining plate fastened at and closing the end of said channel-shaped portion and forming an acute angle therewith, said joining plate having holes therethrough for bolting to a mating one of said ridge clips;

base clips for anchoring each of said vertical column members to a building floor, each of said base clips comprising a generally C-shaped channel-shaped portion adapted to operably couple an end of each of said vertical column members and into which the end of each of said column members is slidably engaged, each of said base clips further comprising a base plate member secured thereto and enclosing an end of said channel-shaped portion and perpendicular thereto, said base plate having holes therethrough for securing to said building floor;

rafter clips for joining one of said rafters to one of said columns, each of said rafter clips including a channel-shaped portion into which the end of a column can be positioned and a rafter plate fastened at and closing the end of said channel shaped portion and forming a obtuse angle therewith, said obtuse angle supplemental to said acute angle; and girder clips each having a channel-shaped portion into which the end of a girder member can be positioned and having an end suitable for engagement with said C-shaped cross-section of a vertical column member.

2. The metal building apparatus of claim 1 further comprising two Z-shaped members suitable for attachment to said rafter members and perpendicular thereto for supporting a sheet roofing material.

3. The metal building apparatus of claim 1 wherein each of said ridge clips, base clips, rafter clips, and girder clips include holes formed therethrough for securing to one of said vertical column members, girder members, or rafter members.

4. The metal building apparatus of claim 1 wherein said ridge clip comprises a channel-shaped portion welded to a joining plate.

5. The metal building apparatus of claim 1 wherein said base clip comprises a channel shaped portion welded to a base plate.

6. The metal building apparatus of claim 1 wherein said rafter clip comprises a channel-shaped portion welded to a rafter plate.

7. A metal building frame, comprising:
channel shaped structural members for rafters, girders and vertical columns;

ridge clips for joining two of said structural members to define a roof line, each of said ridge clips including a first portion for mating with and bolting to one of said rafters and a second portion welded thereto at an acute angle, said second ridge clip to form the ridge of said building;

rafter clips for joining one of said rafters to one of said vertical columns including a third portion for mating with and bolting to said vertical column and a fourth portion welded to said third position at an obtuse angle, said fourth position having holes therethrough for bolting to said rafter; girder clips for joining one of said girders to one of said vertical columns including a fifth position for mating with and bolting to said girder and a sixth portion for mating with said column; and base clips for joining one of said vertical columns to a floor including a seventh portion for mating with and bolting to said vertical column said seventh portion further comprising a generally C-shaped channel portion having a plurality of bolt receiving apertures passing therethrough and an eighth portion welded to said seventh portion, enclosing an end thereof and perpendicular thereto having holes therethrough for bolting to said floor.

8. The metal building frame of claim 7 further comprising Z-shaped roof supporting members suitable for bolting to said rafters and perpendicular thereto for supporting a sheet roofing material.

9. The metal building frame of claim 7 wherein said first, third, fifth, and seventh portions each comprise a channel-shaped portion into which one of said channel-shaped structural members can be bolted.

10. The metal building frame of claim 7 wherein said first, third, fifth, and seventh portions each comprises a channel-shaped portion adapted to be inserted into and bolted to the end of one of said channel-shaped structural members.

* * * * *